(12) United States Patent
Behaghel et al.

(10) Patent No.: US 8,938,975 B2
(45) Date of Patent: Jan. 27, 2015

(54) CONTROL OF AXIAL THRUST BY GUIDANCE OF THE AIR DRAWN OFF FROM A CENTRIFUGAL COMPRESSOR

(75) Inventors: Laurent Donatien Behaghel, Montgeron (FR); Frederic Dallaine, Vulaines (FR); Delphine Leroux, Samois sur Seine (FR); Benjamin Philippe Pierre Pegouet, Cergy (FR)

(73) Assignee: SNECMA, Paris (FR)

( * ) Notice: Subject to any disclaimer, the term of this patent is extended or adjusted under 35 U.S.C. 154(b) by 904 days.

(21) Appl. No.: 13/154,775

(22) Filed: Jun. 7, 2011

(65) Prior Publication Data
US 2011/0296842 A1    Dec. 8, 2011

(30) Foreign Application Priority Data

Jun. 8, 2010 (FR) ..................................... 10 54486

(51) Int. Cl.
F02C 7/12 (2006.01)
F01D 3/04 (2006.01)
F01D 5/04 (2006.01)
F01D 5/08 (2006.01)
(Continued)

(52) U.S. Cl.
CPC  *F01D 3/04* (2013.01); *F01D 5/046* (2013.01); *F01D 5/081* (2013.01); *F01D 25/12* (2013.01); *F01D 25/162* (2013.01); *F02C 7/06* (2013.01); *F02C 7/18* (2013.01); *F04D 27/0207* (2013.01); *F04D 29/051* (2013.01); *F05D 2240/12* (2013.01); *F05D 2260/20* (2013.01)
USPC ................... 60/782; 60/785; 60/806; 60/752; 415/208.2; 415/211.2; 416/203; 416/185

(58) Field of Classification Search
USPC ......... 60/752–760, 782, 785, 806; 415/208.2, 415/211.2; 416/203, 198 A, 185
See application file for complete search history.

(56) References Cited

U.S. PATENT DOCUMENTS 3,904,308 A * 9/1975 Ribaud .......................... 415/143
5,297,928 A   3/1994 Imakiire et al.
(Continued)

FOREIGN PATENT DOCUMENTS

DE   10 2006 048 784 A1   4/2008
EP        1 881 181 A2    1/2008
(Continued)

OTHER PUBLICATIONS

French Preliminary Search Report issued Feb. 2, 2011, in French 1054486, filed Jun. 8, 2010 (with English Translation of Category of Cited Documents).

*Primary Examiner* — Phutthiwat Wongwian
*Assistant Examiner* — Steven Sutherland
(74) *Attorney, Agent, or Firm* — Oblon, Spivak, McClelland, Maier & Neustadt, L.L.P.

(57) ABSTRACT

An inner combustion chamber casing of a turbomachine, which is intended to be placed downstream of a centrifugal compressor, is provided. The casing has the shape of a disc, pierced by a central circle, and includes on its disc at least one guide vane of the drawn-off air. The guide vane extends longitudinally over the disc between the periphery of the disc and the central circle and spreads out axially from the disc so as to form with the downstream face of the centrifugal compressor a guide channel for the air which is drawn off upon exit from the said compressor. The guide vane has a curved shape orienting in a radial direction at the level of its most central end.

10 Claims, 3 Drawing Sheets

(51) Int. Cl.
*F01D 25/12* (2006.01)
*F01D 25/16* (2006.01)
*F02C 7/06* (2006.01)
*F02C 7/18* (2006.01)
*F04D 27/02* (2006.01)
*F04D 29/051* (2006.01)

(56) References Cited

U.S. PATENT DOCUMENTS

| | | | |
|---|---|---|---|
| 6,035,627 A | 3/2000 | Liu | |
| 6,966,191 B2 | 11/2005 | Fukutani et al. | |
| 7,624,580 B2 * | 12/2009 | Fukutani | 60/785 |
| 7,682,131 B2 | 3/2010 | Legare et al. | |
| 7,937,951 B2 | 5/2011 | Brunet et al. | |
| 2008/0080969 A1 * | 4/2008 | Legare et al. | 415/170.1 |
| 2008/0193277 A1 | 8/2008 | Legare | |
| 2010/0028138 A1 | 2/2010 | Argaud et al. | |

FOREIGN PATENT DOCUMENTS

| | | |
|---|---|---|
| EP | 1 882 825 A1 | 1/2008 |
| EP | 1 905 963 A2 | 4/2008 |
| GB | 2 401 912 A | 11/2004 |
| WO | 99/54609 | 10/1999 |

* cited by examiner

CONTROL OF AXIAL THRUST BY GUIDANCE OF THE AIR DRAWN OFF FROM A CENTRIFUGAL COMPRESSOR

BACKGROUND OF THE INVENTION

1. Field of the Invention

The field of the present invention is that of turbomachines and, more particularly, that of the calibration of the thrust exerted on the bearings of these turbomachines.

2. Description of the Related Art

A turbomachine is made up of numerous parts having, for the most part, transverse extensions in relation to its rotational axis, on which transverse extensions are exerted axial forces generated by the pressures of the air in which they bathe. The existing multiple cavities of pressurized air thus create stresses upon the turning parts (rotors) and upon the fixed parts (stators), which stresses add to the aerodynamic stresses exerted on the blades. Whereas the stresses incurred by the stators are sustained by the different casings, those experienced by the rotors add to these and their resultant is absorbed by the thrust bearing which supports the corresponding rotation shaft. It is necessary to control, for all loads, the level of stresses applied to the bearing, in order to ensure that these stresses are neither too strong, in which case there would be a risk of damage to the bearing, nor too weak, in which case there would be a risk of support losses and of possible vibratory phenomena in the axial direction. In general terms, for reasons of controlling the axial clearance of the compressor, it is arranged that the resulting thrust exerted on the shaft shall be directed forwards.

In the case of a turbomachine comprising a centrifugal compressor, the downstream face of the compressor constitutes a disc extending transversely over the whole of the section of the engine and it can be the focus of considerable stresses, as a function of the pressure exerted thereon. The pressure exerted in the cavity situated downstream of this face constitutes a fundamental element for controlling the thrust exerted on the thrust bearing; it is important, however, that it is controlled perfectly. Examples of such turbomachines are given by the patent applications filed by the Applicant and published under references EP 1881181 and EP 1882825.

As can be seen in FIG. 1, where it is represented in dotted lines, a portion of the air flow emanating from the centrifugal compressor is drawn off in order to feed or pressurize cavities associated with the turbine of the engine. This air makes its way in the first place towards the shaft of the engine, skirting the downstream face of the centrifugal compressor, before taking a longitudinal direction, and its pressure determines the resulting forwardly directed stress which has to be managed. Owing to the rotation of the impeller of the centrifugal compressor, this air is imparted with a rotational movement and its velocity comprises a not insignificant tangential component, by comparison with its centripetal component. This tangential velocity is traditionally expressed by a coefficient $K_d$, the so-called drag coefficient, which is equal to the ratio between the tangential velocity of the drawn-off air and the linear velocity of the impeller at the considered point. This coefficient therefore has a value which is variable as a function of the radial distance at the considered point, and this generally decreases from the outside towards the central portion of the downstream face of the impeller, owing to a natural correction of the flow towards a more centripetal direction.

The presence of a tangential component for the velocity of the fluid, which is of no practical interest, has the drawback of reducing its static pressure and thus lessening the force applied to the downstream face of the centrifugal compressor. The consequence of this is an axial thrust resultant oriented potentially rearwards, or at least oriented upstream but with insufficient support, which is contrary to the aspired aim to comply with the dimensioning specifications of the turbomachine.

BRIEF SUMMARY OF THE INVENTION

The object of the present invention is to eliminate these drawbacks by proposing a simple device by which the pressure applied to the thrust bearing of a shaft bearing a centrifugal compressor can be managed, especially by controlling the circulation of the air drawn off downstream of this centrifugal compressor, and, in particular, a high level of static pressure can be generated on the periphery of the downstream face of the compressor, whilst avoiding the flow detachments and the vortices at the level of the entry into the guide channels.

To this end, the subject of the invention is an inner combustion chamber casing of a turbomachine, which casing is intended to be placed downstream of a centrifugal compressor, the said casing having the form of a disc, pierced by a central circle. It comprises on its disc at least one guide vane for the drawn-off air, the said guide vane extending longitudinally over the said disc between the periphery of the disc and the central circle and spreading out axially from the disc so as to form with the downstream face of the said centrifugal compressor a guide channel for air drawn-off upon exit from the said compressor. It is characterized in that the said guide vane has a curved shape orienting in a radial direction at the level of its most central end.

The air entering the air-bleed duct generally has a substantially tangential direction, owing to the rotation of the impeller of the centrifugal compressor, and the presence of a guide vane oriented from the periphery towards the central circle forces it to adopt a more radial direction, thereby reducing its tangential velocity component. The correction of the air, reducing the tangential component of the air and therefore its total velocity, produces a rise in its static pressure. The increase in pressure in the cavity situated downstream of the downstream face of the centrifugal compressor helps to increase the force of the thrust, directed upstream, which is exerted thereon. According to the invention, the flow detachments and vortices at the level of the entry into the guide channels can be avoided by virtue of the curved shape of the guide vanes, which are radially oriented only on their portion nearest to the central circle.

Preferably, the disc comprises a plurality of guide vanes regularly distributed over its circumference.

In one embodiment, the guide vane extends longitudinally from the periphery of the disc up to the central circle.

Advantageously, the guide vane comprises over its length at least one radially oriented rectilinear segment.

Preferably, the guide vane is oriented in a radial direction over the majority of its length. The tangential component is thus totally eliminated and the pressure on the downstream face of the centrifugal compressor is optimally increased without lowering the rate of the flow sent in the direction of the turbine.

In one particular embodiment, the guide vane is oriented in a tangential direction at the level of its end nearest to the periphery of the said casing.

The invention also relates to a combustion chamber module of a turbomachine comprising a chamber casing such as described above. A module in a turbomachine is an aggregate of assembled parts which make up an element that can be delivered separately. A turbomachine can be constituted by the assembly of all the modules.

Finally, it relates to a turbomachine comprising a chamber casing such as described above.

BRIEF DESCRIPTION OF THE SEVERAL VIEWS OF THE DRAWINGS

The invention will be better understood, and other objects, details, characteristics and advantages thereof will become more clearly apparent, in the course of the following detailed explanatory description of one embodiment of the invention given by way of a purely illustrative and non-limiting example, with reference to the appended schematic drawings, in which.

DETAILED DESCRIPTION OF THE INVENTION

Figure 1:
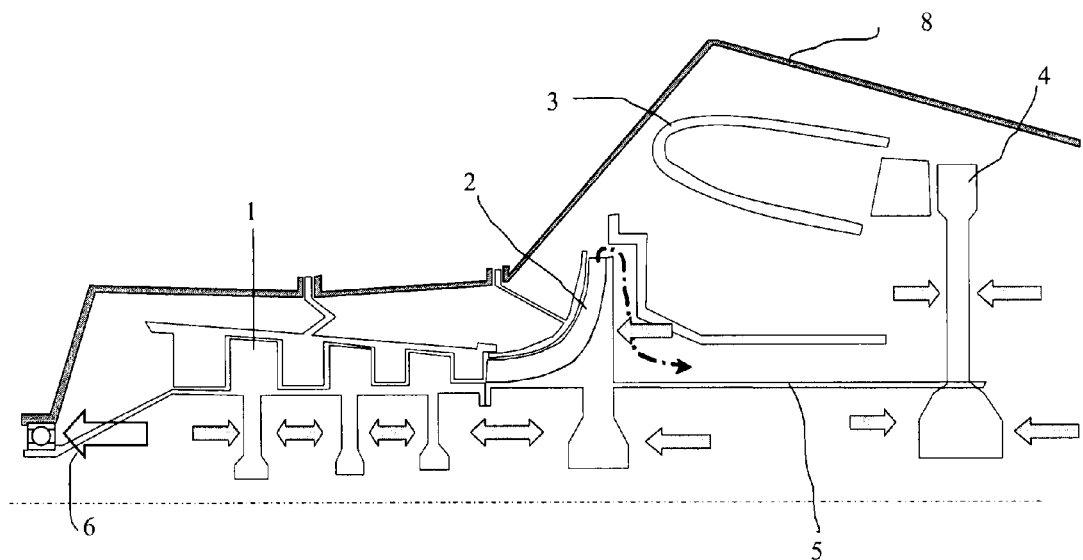
FIG. 1 is a simplified sectional view of the high-pressure body of a turbomachine comprising a last compression stage realized by a centrifugal compressor.

Referring to FIG. 1, the high-pressure body of a turbomachine comprising, in the direction of flow of the fluid, an axial compressor 1 followed, for the last compression stage, by a centrifugal compressor 2, is seen in schematic representation. Upon exit from this compressor, the compressed air passes via a guide vane (not represented) into a combustion chamber 3, where it is mixed with fuel and burnt to produce the power. The burnt gases pass through a high-pressure turbine 4, which draws off from them power to drive the compressors 1 and 2. The aggregate of compressors and turbine is mechanically connected by a high-pressure shaft 5, which is held in place in the turbomachine by means of, inter alia, a ball bearing 6 attached to the structure of the turbomachine. This bearing 6 forms a stop means for the shaft 5 and transmits the thrust forces resulting from the stresses exerted on the different parts of the high-pressure body. FIG. 1 shows, with the aid of grey-tinted arrows, the different pressures which are exerted on the radially oriented elements and, with the aid of a non-grey-tinted arrow, the thrust resultant supported by the bearing 6.

Figure 2:
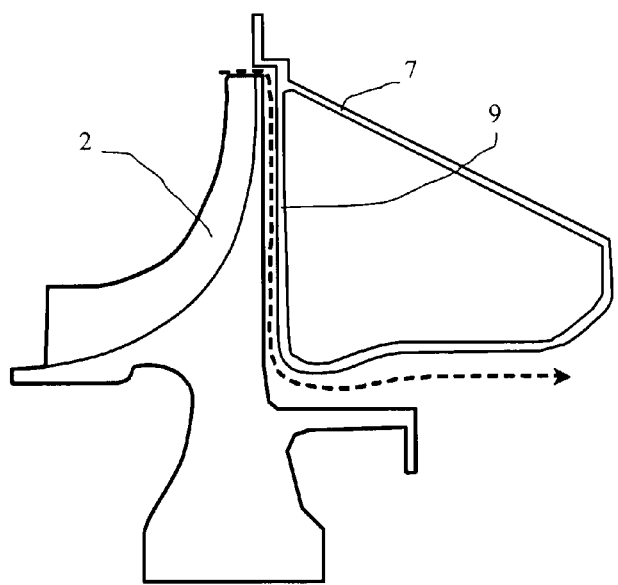
FIG. 2 is a detailed sectional view of FIG. 1, showing the path of the air drawn off downstream of the centrifugal compressor.

Downstream of the centrifugal compressor 2 is found an inner chamber casing 7, which forms, with the outer casing 8 of the HP body, an air-feed cavity for the combustion chamber 3. The inner chamber casing comprises a radially extending portion, in the shape of a disc 9 pierced by a central circle 12, which forms with the rear face of the centrifugal compressor a duct for the circulation of the cooling and pressurizing air sent in the direction of the turbine 4. The path of the air circulating in this duct is represented in dotted representation in FIGS. 1 and 2.

Figure 3:
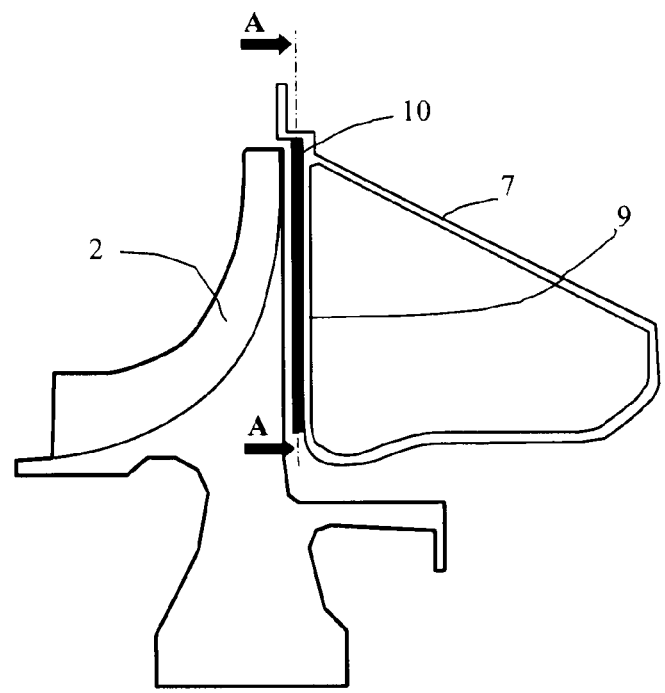
FIG. 3 is a sectional view of the centrifugal compressor of FIG. 1 and of the downstream-situated chamber casing, the said casing bearing a flow-guiding device according to one embodiment of the invention.
Figure 4:
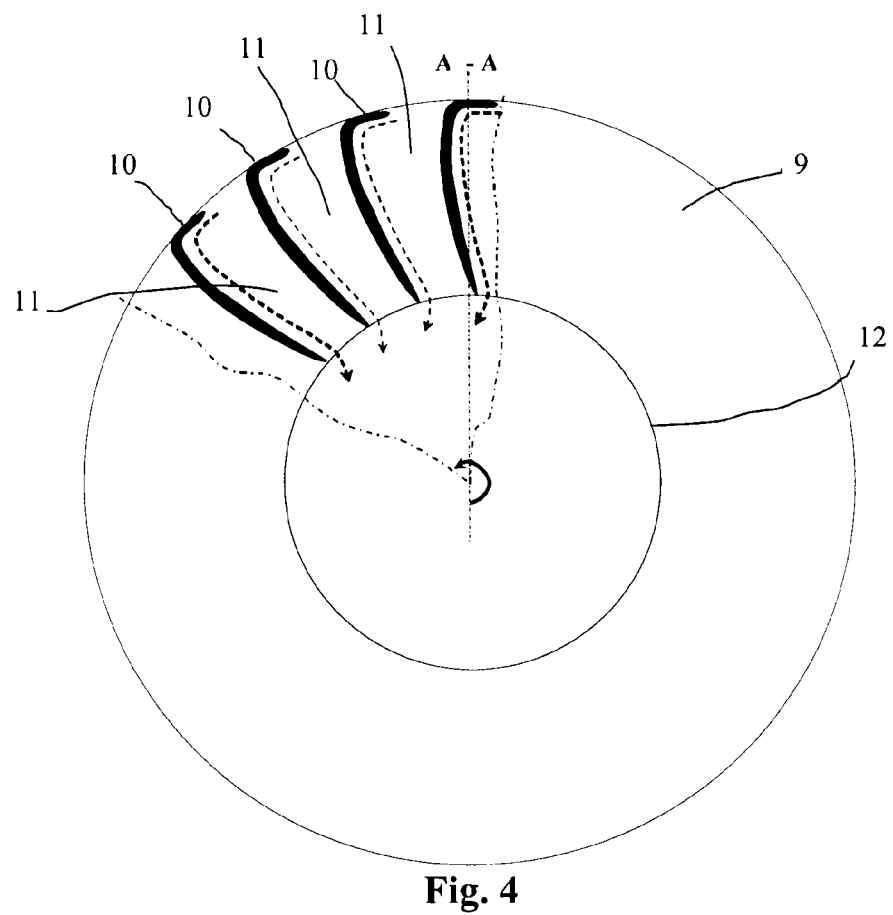
FIG. 4 is a front view of the casing of FIG. 3, bearing a guide device sectioned along a transverse plane.

Referring now to FIGS. 3 and 4, a chamber casing according to the invention, on which guide vanes for guiding the flow of this cooling air are fixed, can be seen. These guide vanes 10 have roughly the shape of blades extending in the axis of the engine, perpendicularly to the disc 9 of the chamber casing, so as to occupy the majority of the space contained between the disc 9 and the rear face of the centrifugal compressor 2. As can be seen in FIG. 4, these guide vanes are regularly distributed over the circumference of the disc 9 and form a succession of guide channels 11 for the cooling and pressurizing air flow. These channels are constituted in terms of their side walls by two adjacent guide vanes and in terms of their base by the disc 9, the rear face of the centrifugal compressor 2 serving as a lid for these.

These guide vanes 10 extend radially between the periphery of the disc 9 and its central portion, being oriented substantially in a radial direction to bring the air flow towards a centripetal direction. Their shape is dictated by aerodynamic imperatives and the necessity of creating the least possible head loss in this flow. As represented, without this configuration being imperative, the guide vanes 9 have a substantially tangential direction at the level of the periphery of the disc, which deviates rapidly to become radial over the majority of their length. This tangential orientation is chosen deliberately short so as to correct the air flow as quickly as possible and very soon eliminate its tangential component, insofar as the aerodynamic conditions allow and do not lead to the creation of flow detachments or vortices on the guide vanes. In so doing, the static pressure of the air becomes the maximum possible from the point of its entry into the guide channel 11.

The orientation of the guide vanes at the level of the central orifice 12 of the disc 9 is preferably radial in order that the air flow has a direction close to the radial direction when leaving the guide channels 11. This configuration ensures there once again a static pressure maximal to this flow and therefore a maximum force exerted by it on the rear face of the centrifugal compressor 2.

Figure 5:
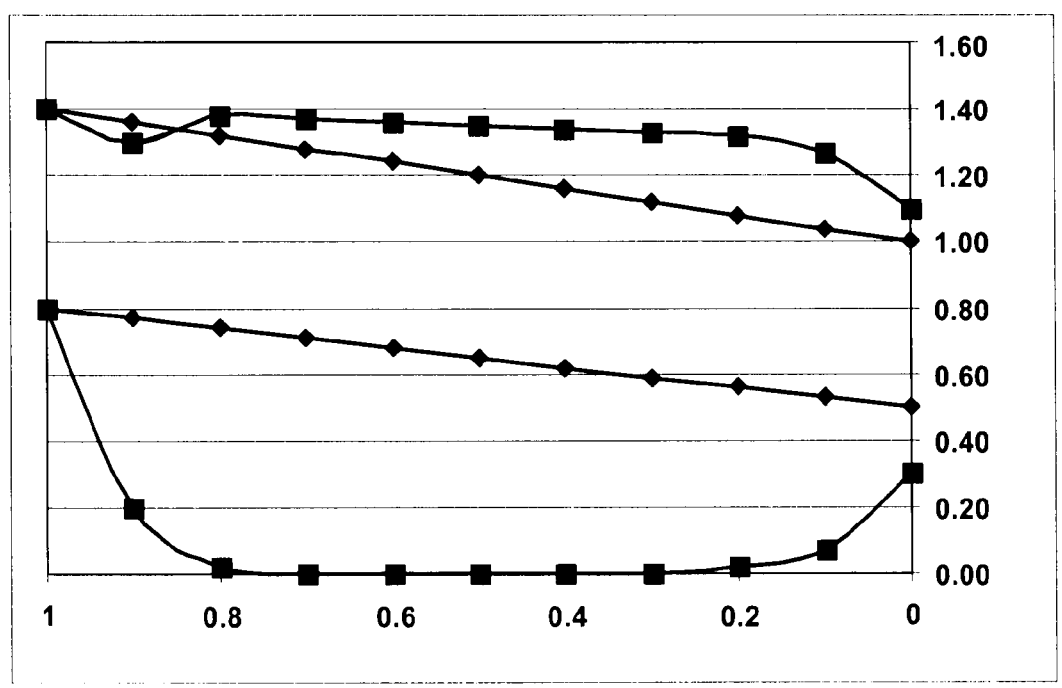
FIG. 5 is a diagram showing the evolutions of the drag coefficient and of the applied static pressure, as a function of the radius.

FIG. 5 gives the results obtained with this configuration, in terms of drag coefficient and in terms of applied static pressure, as a function of the radial distance from the considered point. The x-axis gives the radius of the considered point, between the periphery of the disc (value 1) and the central circle (value 0), whereas the y-axis gives the values of the coefficient $K_d$ and of the static pressure $P_s$ related to a reference value for each of these two parameters. The reference value for the static pressure is taken equal to that obtained at the level of the central circle 12 in the absence of blades, whereas that of the drag coefficient is taken equal to 1.25 times the value of this coefficient upon entry into the air circulation duct.

The two curves placed at the bottom of the figure give the trend of the coefficient as a function of the radius in the two cases "without blade", that is to say according to the prior art for the higher curve, and "with blade", that is to say according to the invention for the lower curve. It is found that, in the prior art, the drag coefficient decreases in a regular pattern from 0.8 to 0.5 as it approaches the central circle, which expresses the natural progressive decrease in the tangential velocity of the flow as it approaches the central circle 12. In the invention, on the other hand, this coefficient falls rapidly towards zero, owing to the radial orientation of the guide vanes, which eliminates the tangential component of the velocity, before somewhat rising again at the level of the central circle 12 when the flow approaches the exit from the said guide vanes.

As regards the trend of the static pressures, as can be seen on the two upper curves, in the prior art (lower curve), a slow decrease when approaching the central circle 12 is found, which is coherent with the observed decrease in the drag coefficient, whereas in the invention (upper curve) the static pressure remains at a raised level over practically the entire height of the disc 9. The trend of this curve is here also coherent with the observed trend of the coefficient $K_d$ and the associated reduction of the tangential velocity of the flow.

The working of the invention deduces itself naturally from the pressure trends described by FIG. 5. The presence of the guide vanes on the disc 9 eliminates the tangential component of the circulation velocity of the air passing through the channels 11. As the velocity of this air decreases, its static pressure increases, which makes it possible to augment the pressure force which it generates on the downstream face of the centrifugal compressor 2. The special shape given to these guide vanes, with a rapidly radial orientation, makes it possible to obtain a raised pressure from the point of entry of the air into the channels 11 and therefore to maximize the thrust on the bearing 6 procured by the downstream face of the compressor 2. The improvement brought about by the invention is measured by the difference between the ordinates of the two topmost curves of FIG. 5.

The invention claimed is:

1. An inner combustion chamber casing of a turbomachine, the casing intended to be placed downstream of a centrifugal compressor, the casing comprising:
    a radially extending portion presenting a disc pierced by a central circle; and
    at least one guide vane of drawn-off air, the guide vane extending radially over the disc between a periphery of the disc and the central circle and spreading out axially from the disc so as to form with a downstream face of the centrifugal compressor a guide channel for the air which is drawn off upon exit from the compressor,
    wherein a first radially outer end of the guide vane extends radially beyond an outer circumference of the centrifugal compressor, and
    wherein the guide vane has a curved shape orienting in a radial direction at a second radially inner end.

2. The casing according to claim 1, wherein the disc comprises a plurality of guide vanes regularly distributed over a circumference of the disc.

3. The casing according to claim 2, wherein each of the guide vanes extends radially from the periphery of the disc to the central circle.

4. The casing according to one of claims 1 to 3, wherein the guide vane comprises over a length thereof at least one radially oriented rectilinear segment.

5. The casing according to claim 4, wherein the guide vane is oriented in a radial direction over a majority of the length thereof.

6. The casing according to claim 1, wherein the first end of the guide vane is oriented in a tangential direction.

7. The casing according to claim 6, wherein a portion of the guide vane oriented in the tangential direction has a radial position substantially equal to a radial position of the periphery of the disc.

8. The casing according to claim 7, wherein a length of the portion of the guide vane oriented in the tangential direction is less than a length of a portion of the guide vane oriented in a radial direction.

9. A combustion chamber module of a turbomachine, comprising a chamber casing according to claim 1.

10. A turbomachine comprising a chamber casing according to claim 1.

* * * * *